US012757823B2

(12) United States Patent
Lee et al.

(10) Patent No.: US 12,757,823 B2
(45) Date of Patent: Oct. 13, 2026

(54) MULTI-DIRECTIONAL BLADE GUARD

(71) Applicant: TECHTRONIC CORDLESS GP, Anderson, SC (US)

(72) Inventors: Hei Man Lee, Hong Kong (CN); Man Ho Choi, Hong Kong (CN); Hok Sum Sam Lai, Hong Kong (CN); Ho Lam Ng, Hong Kong (CN)

(73) Assignee: Techtronic Cordless GP, Anderson, SC (US)

( * ) Notice: Subject to any disclaimer, the term of this patent is extended or adjusted under 35 U.S.C. 154(b) by 572 days.

(21) Appl. No.: 18/185,244

(22) Filed: Mar. 16, 2023

(65) Prior Publication Data

US 2023/0292661 A1 Sep. 21, 2023

Related U.S. Application Data

(60) Provisional application No. 63/321,487, filed on Mar. 18, 2022.

(51) Int. Cl.
*A01D 34/82* (2006.01)
*A01D 34/81* (2006.01)
*A01D 101/00* (2006.01)

(52) U.S. Cl.
CPC ........... *A01D 34/828* (2013.01); *A01D 34/81* (2013.01); *A01D 2101/00* (2013.01)

(58) Field of Classification Search
CPC .............................. A01D 34/828; A01D 34/81
See application file for complete search history.

(56) References Cited

U.S. PATENT DOCUMENTS 2,200,368 A * 5/1940 Iverson .................. A01D 34/46 180/19.1
2,511,124 A * 6/1950 Phelps ................. A01D 34/828 56/17.4
2,539,779 A * 1/1951 Grosso ................... A01D 34/63 15/337
2,557,598 A * 6/1951 Daggett ................. A01D 34/63 56/DIG. 3
2,906,082 A * 9/1959 Mathis ................. A01D 34/828 56/320.1
2,934,882 A * 5/1960 Kaut, Jr. .............. A01D 34/828 56/320.1

(Continued)

FOREIGN PATENT DOCUMENTS

CN 204653018 U * 9/2015 ............. A01D 34/82
CN 213044199 U 4/2021

(Continued)

OTHER PUBLICATIONS

English Translation of CN-204653018-U (Year: 2015).*

(Continued)

*Primary Examiner* — Claude J Brown
(74) *Attorney, Agent, or Firm* — Michael Best & Friedrich LLP

(57) ABSTRACT

A robotic garden tool including a body having a first end and a second end opposite the first end, one or more wheels rotatably coupled to the body, and a cutting assembly coupled to the body. The robotic garden tool also includes a first grass comb positioned between the cutting assembly and the first end, and a second grass comb positioned between the cutting assembly and the second end.

20 Claims, 11 Drawing Sheets

(56) References Cited

U.S. PATENT DOCUMENTS

| | | | | | |
|---|---|---|---|---|---|
| 2,972,849 | A * | 2/1961 | Ridenour | A01D 75/20 | D15/17 |
| 3,038,289 | A * | 6/1962 | Cross | A01D 75/20 | 56/255 |
| 3,057,140 | A * | 10/1962 | Ridenour | A01D 34/63 | 56/DIG. 15 |
| 3,148,490 | A * | 9/1964 | Chadwick | A01D 34/828 | 56/320.2 |
| 3,312,049 | A * | 4/1967 | Walker | A01D 34/828 | 56/255 |
| 3,481,124 | A * | 12/1969 | Machovina | A01D 34/828 | 56/255 |
| 3,665,693 | A * | 5/1972 | Dacus | A01D 75/20 | 56/320.1 |
| 3,680,294 | A * | 8/1972 | Dacus | A01D 34/828 | 56/320.1 |
| 3,715,875 | A * | 2/1973 | Brucker | A01D 34/828 | 56/320.1 |
| 3,754,386 | A * | 8/1973 | Armstrong | A01D 34/81 | 56/320.2 |
| 3,805,498 | A * | 4/1974 | Armstrong | A01D 34/71 | 56/320.2 |
| 3,971,199 | A * | 7/1976 | Buchele | A01D 34/828 | 56/320.2 |
| 4,015,408 | A * | 4/1977 | Cornellier | A01D 34/828 | 56/17.4 |
| 4,037,396 | A * | 7/1977 | Buchele | A01D 34/828 | 56/320.1 |
| 4,069,651 | A * | 1/1978 | Steffen | A01D 34/828 | 56/320.1 |
| 4,107,907 | A * | 8/1978 | Rutherford | A01D 34/828 | 56/320.2 |
| 4,597,251 | A * | 7/1986 | Cornellier | A01D 34/30 | 56/246 |
| 6,269,621 | B1 * | 8/2001 | Fischier | A01D 34/74 | 56/320.2 |
| 11,350,564 | B1 | 6/2022 | Hoyda | | |
| 2001/0045017 | A1 | 11/2001 | Tezuka et al. | | |
| 2007/0145933 | A1 | 6/2007 | Kosaka | | |
| 2018/0015951 | A1 | 1/2018 | Swecker | | |
| 2019/0297777 | A1 * | 10/2019 | Patel | A01D 34/828 | |
| 2019/0387675 | A1 * | 12/2019 | Finlayson | A01D 34/66 | |
| 2021/0286368 | A1 * | 9/2021 | Jung | A01D 34/008 | |
| 2024/0268259 | A1 | 8/2024 | Allard et al. | | |

FOREIGN PATENT DOCUMENTS

| | | | | |
|---|---|---|---|---|
| DE | 102020131805 | A1 | 6/2021 | |
| FR | 2682259 | A1 | 4/1993 | |
| JP | 2016208950 | A | 12/2016 | |
| JP | 2019187315 | A * | 10/2019 | |
| WO | WO-2015184674 | A1 * | 12/2015 | A01D 34/82 |

OTHER PUBLICATIONS

English translation of JP-2019187315-A (Year: 2019).*
Chinese Patent Office Action for Application No. 202310275019.6 dated Apr. 29, 2026 (29 pages including English translation).

* cited by examiner

MULTI-DIRECTIONAL BLADE GUARD

CROSS-REFERENCE TO RELATED APPLICATION

This application claims priority to co-pending U.S. Provisional Patent Application No. 63/321,487, filed Mar. 18, 2022, the entire contents of which are incorporated herein by reference.

FIELD OF THE INVENTION

The embodiments described herein related to a blade guard for robotic garden tools, and more specifically to a blade guard that accommodates cutting when the tool is traveling in multiple direction.

BACKGROUND OF THE INVENTION

Garden tools may include a rotating blade at least partially encompassed by a blade guard. The guard, in turn, is designed for mowing in a single direction of travel.

SUMMARY

In one aspect, a robotic garden tool including a body having a first end and a second end opposite the first end, one or more wheels rotatably coupled to the body, and a cutting assembly coupled to the body. The robotic garden tool also includes a first grass comb positioned between the cutting assembly and the first end, and a second grass comb positioned between the cutting assembly and the second end.

Alternatively or additionally, in any combination, further including a first bumper movably coupled to the body proximate the first end, and where the first bumper includes a first bumper comb.

Alternatively or additionally, in any combination, further including a second bumper movably coupled to the body proximate the second end, and where the second bumper includes a second bumper comb.

Alternatively or additionally, in any combination, where the cutting assembly includes a blade guard defining a guard axis, a motor fixedly coupled to the blade guard, and a cutting blade rotatable with respect to the blade guard about the guard axis.

Alternatively or additionally, in any combination, where the body defines a longitudinal axis passing through the first end and the second end, and where the blade guard includes a plurality of ribs, and where each rib is oriented parallel to the longitudinal axis.

Alternatively or additionally, in any combination, where the blade guard includes a base plate and one or more ribs, where at least a portion of at least one rib is spaced a distance from the base plate to define a volume therebetween, and where at least a portion of the cutting blade is positioned within the volume when rotating with respect to the blade guard about the guard axis.

Alternatively or additionally, in any combination, where the body defines a longitudinal axis passing through the first end and the second end, where at least one of the first grass comb and the second grass comb define a comb width measured perpendicular to the longitudinal axis, and where the comb width is greater than the blade diameter.

Alternatively or additionally, in any combination, where the body defines a longitudinal axis passing through the first end and the second end, where at least one of the first grass comb and the second grass comb include a plurality of teeth forming gaps therebetween, and where at least one gap is shaped so that a datum axis oriented parallel to the longitudinal axis can pass through a given gap without engaging either of the teeth adjacent the gap.

Alternatively or additionally, in any combination, where the body defines a longitudinal axis passing through the first end and the second end, where at least one of the first grass comb and the second grass comb include a plurality of teeth forming gaps therebetween, and where each gap is parallel to the longitudinal axis.

Alternatively or additionally, in any combination, where at least one of the first grass comb and the second grass comb is movably coupled to the body.

Alternatively or additionally, in any combination, where at least one of the first grass comb and the second grass comb is fixedly coupled to the body.

In another aspect, a robotic garden tool including a body having a first end and a second end opposite the first end, where the body defines a longitudinal axis passing through both the first end and the second end, and a cutting assembly coupled to the body. Where the cutting assembly including a blade guard defining an axis of rotation, the blade guard including a base plate and one or more ribs, where at least a portion of at least one rib is spaced from the base plate to define a volume therebetween, a cutting blade rotatable with respect to the blade guard about the axis of rotation, and where the at least a portion of the cutting blade is positioned within the volume.

Alternatively or additionally, in any combination, further including one or more grass combs coupled to the body between the cutting assembly and one of the first end and the second end.

Alternatively or additionally, in any combination, where the cutting assembly further comprises a motor fixedly coupled to the blade guard and configured to rotate the cutting blade with respect to the blade guard about the axis of rotation.

Alternatively or additionally, in any combination, where the blade guard defines a longitudinal blade guard axis, and where the one or more ribs are parallel to the blade guard axis.

Alternatively or additionally, in any combination, where the longitudinal blade guard axis is parallel to the longitudinal axis of the body when the blade guard is in a rest position.

Alternatively or additionally, in any combination, where the blade guard includes one or more side guards, and where the side guards form the one or more ribs.

Alternatively or additionally, in any combination, where the side guards are removably coupled to the base plate.

Alternatively or additionally, in any combination, where each side guard includes a first portion extending perpendicular to the base plate and a second portion extending perpendicular to the first portion, and where the second portion forms the one or more ribs.

Alternatively or additionally, in any combination, where the blade guard includes a lateral axis oriented perpendicular to the longitudinal axis of the body, and wherein the blade guard is symmetric about the lateral axis.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

Figure 1:
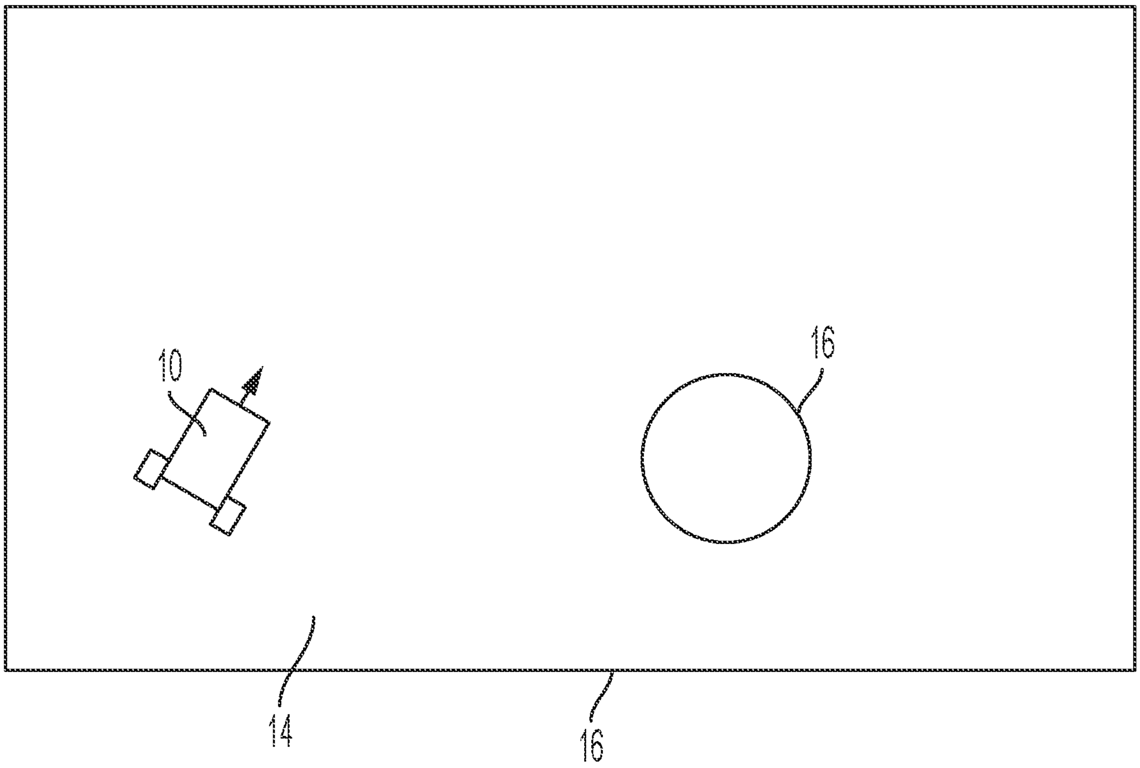
FIG. 1 is a plan view of a robotic lawn mower positioned within a cutting area encompasses by a barrier.
Figure 2:
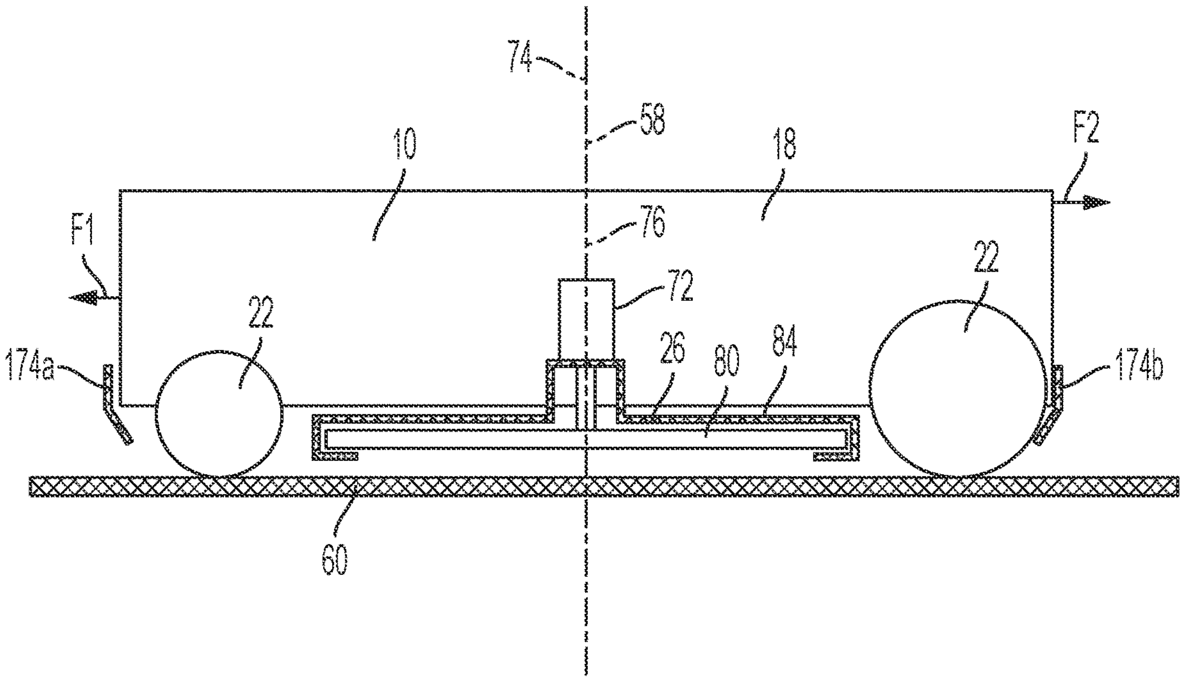
FIG. 2 is a side view of the garden tool of FIG. 1.
Figure 3:
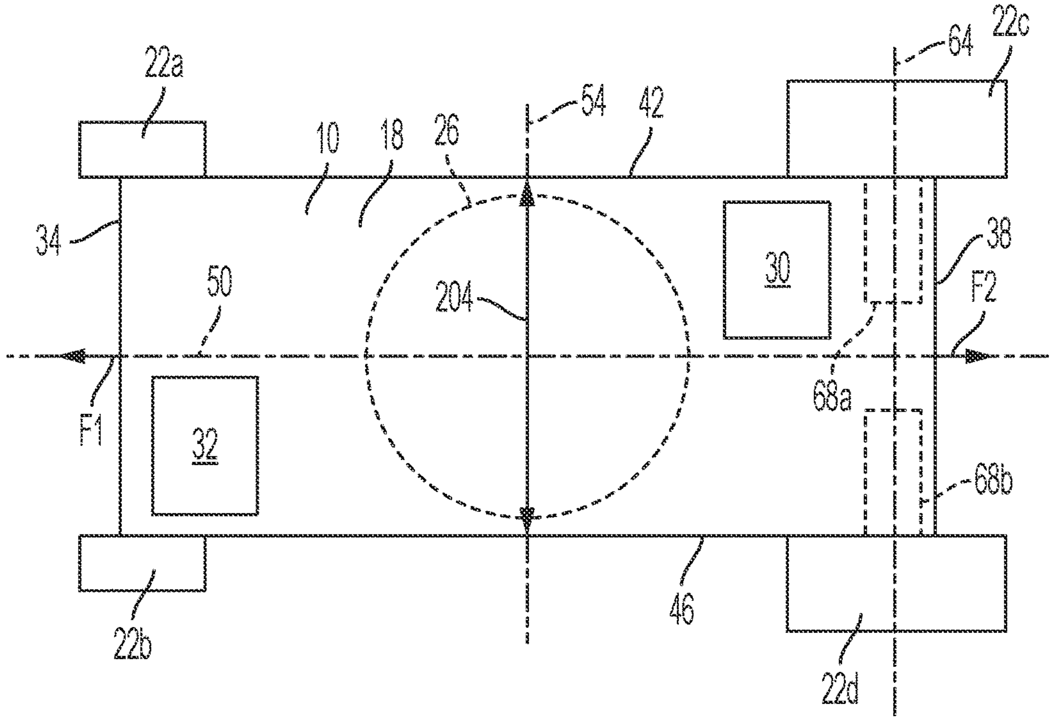
FIG. 3 is a top view of the garden tool of FIG. 1.
Figure 4:
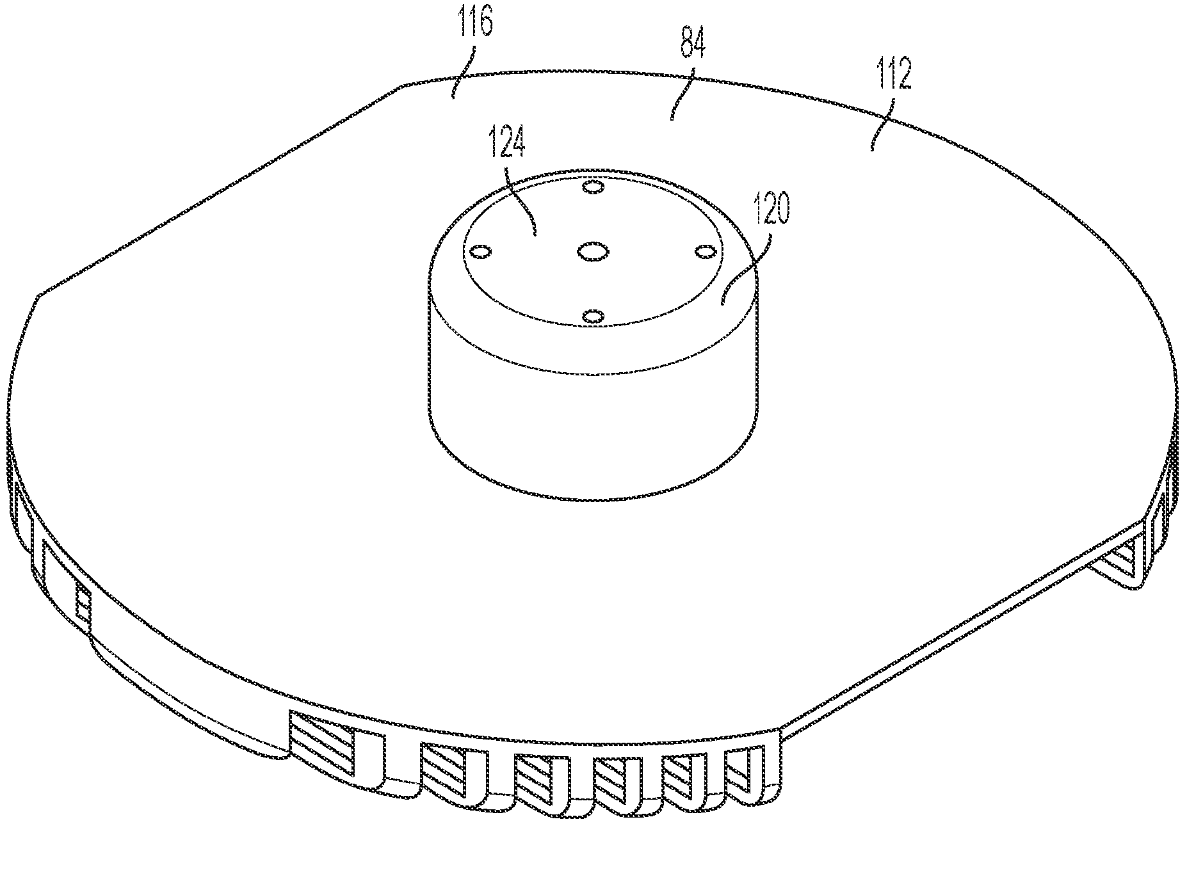
FIG. 4 is a top perspective view of the blade guard of the garden tool of FIG. 1.
Figure 5:
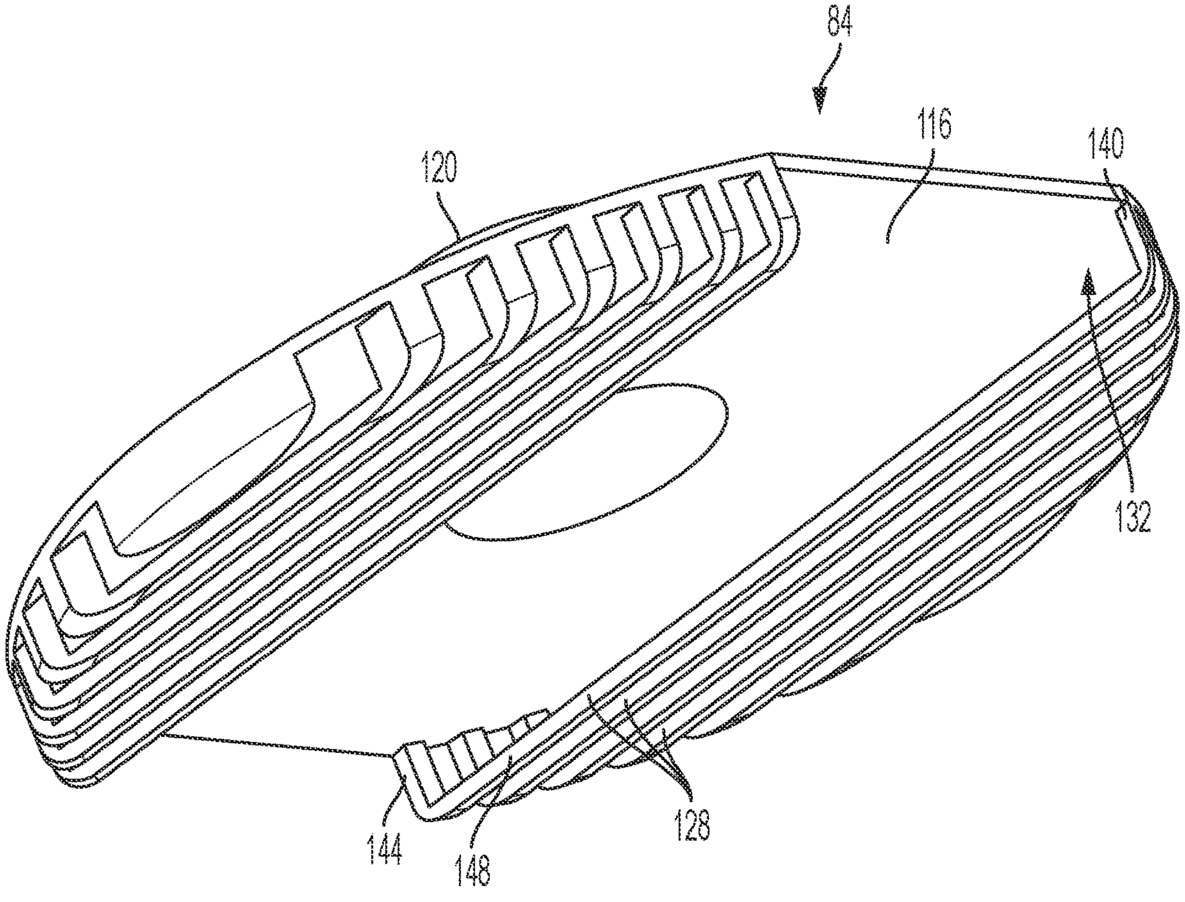
FIG. 5 is a bottom perspective view of the blade guard of FIG. 4.

FIGS. 1-3 illustrate a robotic garden tool 10. More specifically, the garden tool 10 is a robotic lawn mower for use to cut vegetation such as grass in an enclosed cutting area 14. The cutting area 14 generally includes, but is not limited to, a continuous area of grass or other vegetation that is enclosed by one or more barriers 16. In the illustrated embodiment, the barriers 16 include a series of electrified wires enclosing the cutting area 14 while in alternative embodiments different form of barrier may be used such as, but not limited to, walls, pavers, virtual barriers created by GPS data points or beacons, and the like. As shown in FIG. 1, such barriers 16 may be used to enclose the overall cutting area 14 and/or to segregate one or more interior regions from the cutting area 14. While the illustrated garden tool 10 is a lawn mower, it is understood that in alternative embodiments the garden tool 10 may include, but is not limited to, a robotic trimmer, and the like.

As shown in FIGS. 2 and 3, the tool 10 is an electrically powered, self-propelled device that includes a body 18, a plurality of wheels 22 rotatably mounted to the body 18, a cutting assembly 26 mounted to the body 18, a controller 30, and a battery 32. The body 18, in turn, includes a front or first end 34, rear or second end 38 opposite the first end 34, a right or first side 42, and a left or second side 46 opposite the first side 42. The body 18 also defines a longitudinal axis 50 extending along the length of the body 18 and centered between the first side 42 and the second side 46 (e.g., passing through both the first and second ends 34, 38). The body 18 also defines a lateral axis 54 extending along the width of the body 18 and centered between the first and second ends 34, 38 (e.g., passing through both the first and second sides 42, 46). The body 18 also defines a central axis 58 generally positioned at the intersection of the longitudinal and lateral axes 50, 54 and oriented perpendicular to both (e.g., in a generally vertical orientation).

As shown in FIG. 3, the tool 10 includes four wheels **22*a*, 22*b*, 22*c*, 22*d*, each rotatably coupled to the body 18 and configured to support the tool 10 for self-driven movement along a support surface 60 (e.g., the surface of the cutting area 14). In the illustrated embodiment, the wheels 22*a*, 22*b*, 22*c*, 22*d* include two steerable, undriven wheels 22*a*, 22*b* and two non-steerable, driven wheels 22*c*, 22*d*. However, in alternative embodiments, all or any sub-set of the wheels 22 may be driven and all or any sub-set of the wheels 22 may be steerable. Furthermore, while the illustrated steerable wheels are passive in nature (e.g., a caster-style wheel), it is understood that in alternative embodiments the steerable wheels 22*a*, 22*b* may be actively driven by the controller 30. In still other embodiments, the tool 10 may include more or fewer wheels 22 positioned in different arrangements about the tool 10. In still other embodiments, the wheels 22** may be replaced by other forms of propulsion such as, but not limited to, tracks, omni-wheels, walking legs, and the like.

The driven wheels **22*c*, 22*d* of the tool 10 are positioned proximate the second end 38 of the body 18 and rotate about a common rear axis 64 oriented perpendicular to the longitudinal axis 50. In the illustrated embodiment, each rear wheel 22*c*, 22*d* is mounted to and driven by a dedicated electric motor 68*a*, 68*b* to provide propulsion for the tool 10 over the support surface 60. In some embodiments, the wheels 22 may be mounted directly to a respective motor 68*a*, 68*b*** while in other embodiments a gear reduction and the like may be used.

During use, the controller 30 is configured to output signals to the wheel motors **68*a*, 68*b* controlling the rotation of each motor 68*a*, 68*b* independently from each other and, as a result, the rotation of the corresponding driven wheels 22*c*, 22*d*, respectively. The controller 30 is configured to output signals to each motor 68*a*, 68*b* dictating the direction and speed of rotation of each wheel 22*a*, 22*b*. For example, the controller 30 may instruct a motor 68*a*, 68*b* to produce forward rotation (e.g., rotating the respective wheel 22*c*, 22*d* toward the first end 34 of the body 18) or a rearward direction opposite the forward direction (e.g., rotating the respective wheel 22*c*, 22*d* toward the second end 38 of the body 18**).

In the illustrated embodiment, the driven wheels **22*c*, 22*d* are non-steerable. However, in alternative embodiments, the driven wheels 22*c*, 22*d*** may also be steerable.

FIG. 2 illustrates the cutting assembly 26 of the tool 10. More specifically, the cutting assembly 26 includes a blade guard 84 defining a guard axis 76, a cutting motor 72 mounted to the blade guard 84, and a cutting blade 80 in operable communication with the cutting motor 72 and configured to rotate with respect to the blade guard 84 about a blade axis 74. As shown in FIG. 3, the illustrated blade axis 74 is coincident with the guard axis 76. However, in alternative embodiments, the blade axis 74 may be set at an angle to the guard axis 76 and/or offset from the guard axis 76.

In the illustrated embodiment, cutting assembly 26 is a "floating" assembly such that its position can be adjusted relative to the body 18 during operation. More specifically, the blade guard 84 acts as a mounting point for the motor 72 and/or blade 80 so that all three elements move together as a unit during use relative to the body 18 while maintaining their relative alignment. In the illustrated embodiment, the cutting assembly 26 may be adjusted vertically (e.g., axially along the central axis 58) relative to the body 18 to allow the cutting height (e.g., the distance between the blade 80 and the support surface 60) to be adjusted. In still other embodiments, the cutting assembly 26 may also pivot or rotate relative to the body 18 to allow the cutting assembly 26 to accommodate variations in the contour of the support surface 60 and the like.

As shown in FIG. 2, the motor 72 of the cutting assembly 26 is mounted to the blade guard 84 and configured to drive the blade 80 relative thereto. During use, the motor 72 is configured to receive signals from the controller 30 indicating the speed and direction of rotation of the blade 80 relative to the guard 84.

Figure 10:
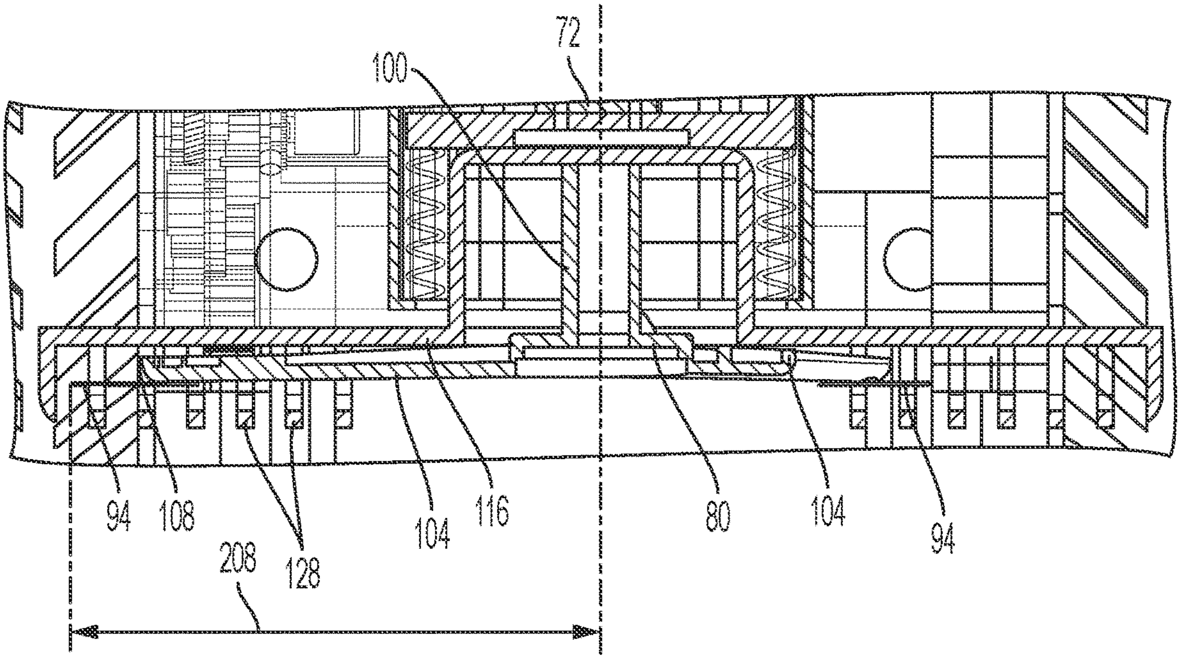
FIG. 10 is the section view of FIG. 9 with a cutting blade installed thereon.

As shown in FIG. 10, the cutting blade 80 of the cutting assembly 26 includes one or more blade elements 94 and is configured to rotate about the blade axis 74 during use. In the illustrated embodiment, the blade 80 includes a spindle 100 configured to be coupled to the motor 72, and one or more arms 104 extending radially outwardly from the spindle 100 opposite the motor 72 to form a corresponding distal end 108 to which the blade elements 94 are removably attached thereto. While the illustrated cutting assembly 26 includes three arms 104 each extending radially outwardly from the spindle 100 at equal intervals from each other (e.g., every 121.66 degrees), in other embodiment, more or fewer arms 104 and/or blade elements 94 may be present. Furthermore, while the illustrated cutting blade 80 is shown being attached directly to the motor 72, it is understood that in alternative embodiments the motor 72 may drive the blade 80 indirectly via a series of gears. In such embodiments, the cutting blade 80 and motor 72 may rotate about different axes.

In still other embodiments, the arms 104 of the cutting blade 80 may be replaced by other structures configured to position the blade elements 94 at the desired radial distance from the guard axis 76. For example, the cutting blade 80 may include a disk with blade elements 94 coupled to the periphery thereof, radial and circumferential struts forming a structure to which the blade elements 94 may be coupled, and the like. In still other embodiments, the blade elements 94 may be formed integrally with the body of the cutting blade 80 to form a single unit.

In the illustrated embodiment, the cutting blade 80 defines a blade diameter 208 generally defined as twice the distance between the blade axis 74 and the most radially distant point of the longest arm 104. In the illustrated embodiment, the cutting blade 80 may include a blade diameter 208 that is no less than 90% the body width 204 at that same location (e.g., the distance between the first end 42 and the second end 46 measured parallel to the lateral axis 54). In other embodiments, the blade diameter 208 is no less than 85%, 80%, 75%, and 70% of the body width 204 at that same location. In still other embodiments, the distal end 108 of the longest arm 104 will be positioned no further than 10 cm from the corresponding side 42, 46 when it is at its closest proximity thereto. In other embodiments, the distal end 108 of the longest arm 104 will be positioned no less than 8 cm, 6 cm, and 5 cm from the corresponding side 42, 46 when the distal end 108 is at its closest proximity thereto.

As shown in FIGS. 4-9, the blade guard 84 is configured to at least partially encompass and protect the cutting blade 80 while allowing grass and vegetation access thereto while the tool 10 travels in the forward F1 and rearward F2 directions. More specifically, the blade guard 84 serves multiple roles during use including allowing the blade 80 to freely rotate about the guard axis 76, allowing grass and other vegetation to come into contact with the blade 80 regardless of whether the tool 10 is traveling in the forward F1 or rearward F2 direction, protecting the cutting blade 80 from the ground and large debris, and protecting the end user from coming into contact with the blade 80 while the blade 80 is rotating.

The blade guard 84 includes a body 112 having a base plate 116 defining the guard axis 76, a hub 120 extending axially from one side of the base plate 116 to form a first or closed end 124, and a plurality of ribs 128 extending from the base plate 116 opposite the hub 120. Together, the ribs 128, base plate 116, and hub 120 at least partially enclose a blade volume 132 configured to at least encompass the cutting blade 80 therein. The blade guard 84 also defines a longitudinal axis 126 and a lateral axis 130, each passing through the guard axis 76. When the blade guard 84 is installed on the body 18, the longitudinal axis 126 generally aligns with the longitudinal axis 50 of the body 18 while the lateral axis 130 generally corresponds to the lateral axis 54 of the body 18.

Figure 8:
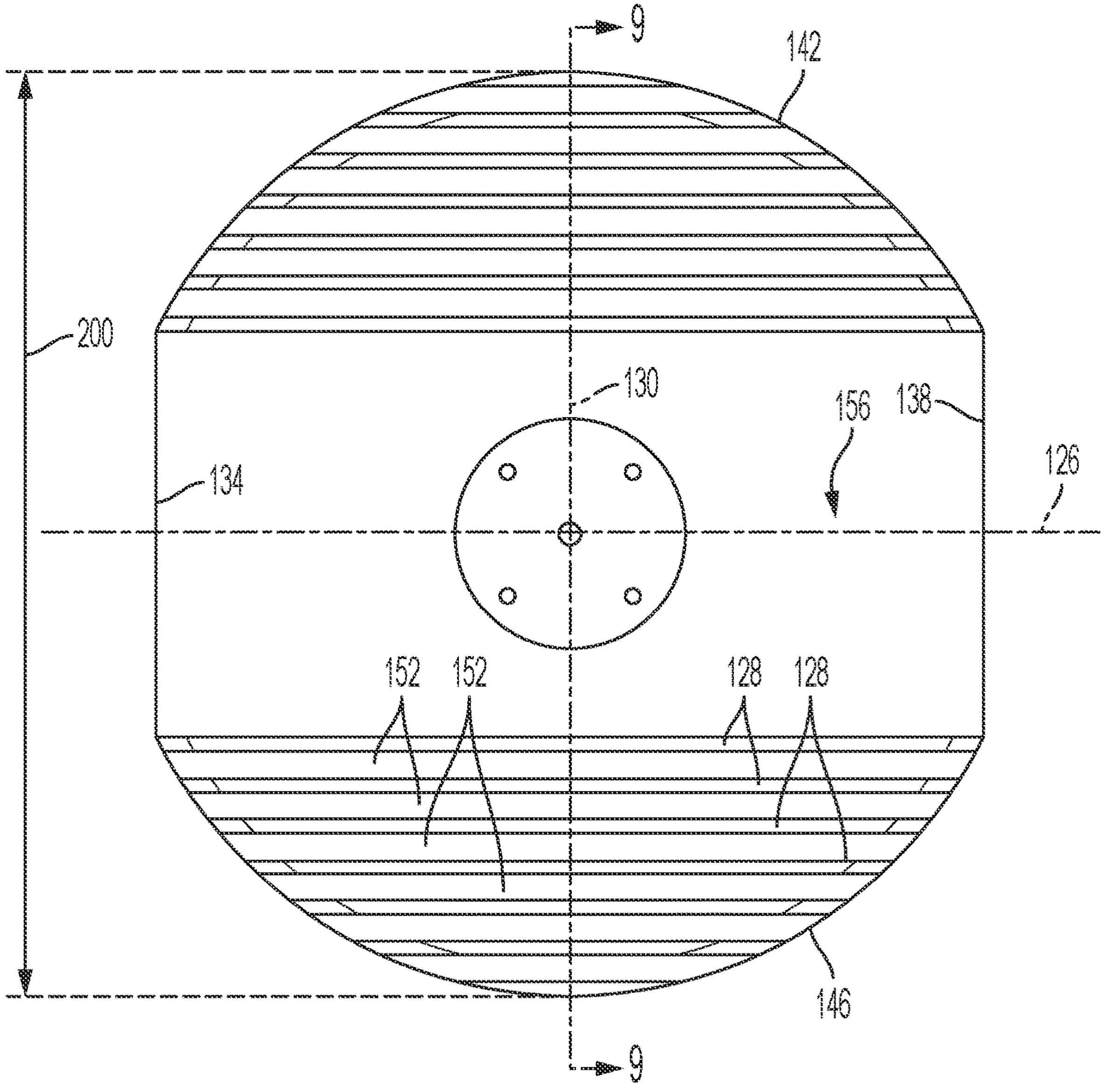
FIG. 8 is a bottom view of the blade guard of FIG. 4.
Figure 9:
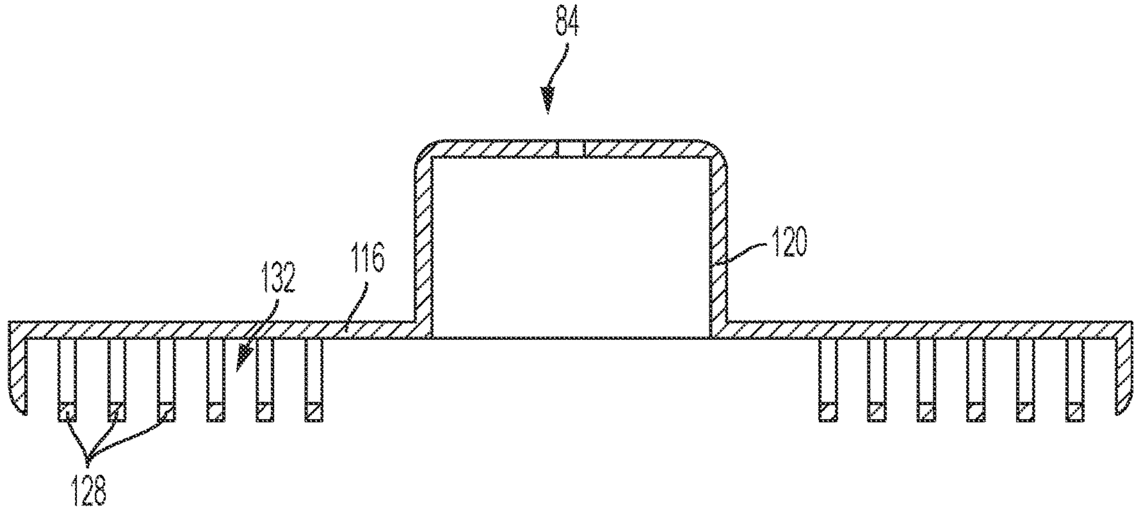
FIG. 9 is a section view taken from line 9-9 of FIG. 8.

As shown in FIG. 8, the base plate 116 of the blade guard 84 is a flat plate having a leading edge 134, a trailing edge 138 opposite the leading edge 134, a left or first side 142 extending between the leading edge 134 and the trailing edge 138, and a right or second side 146 extending between the leading edge 134 and the trailing edge 138 and opposite the first arcuate side 142. When the guard 84 is installed on the body 18, the leading edge 134 is positioned proximate the first end 34 of the body 18, the trailing edge 138 is positioned proximate the second end 38 of the body 18, the first side 142 is positioned proximate the first edge 42, and the second side 146 is positioned proximate the second edge 46. In the illustrated embodiment, the leading and trailing edges 134, 138 are generally linear in contour while the first and second sides 142, 146 are arcuate. However, in alternative embodiments the base plate 116 may form different shapes whereby the edges 134, 138, 142, 146 have different contours. For example, in alternative embodiments the base plate 116 may include a rectangular shape, a circular shape, and/or other polygonal shapes. In still other embodiments, the base plate 116 may form some combination thereof.

The hub 120 of the blade guard 84 is substantially cylindrical in shape extending axially from the base plate 116 from one side thereof to form an enclosed end 144. During use, the enclosed end 144 of the hub 120 is mounted to the body 18 of the tool 10 (e.g., via a height adjuster or other adjustment mechanism).

The blade guard 84 also includes a plurality of ribs 128 extending from the base plate 116 and configured to at least partially define the blade volume 132 therebetween. Each rib 128 is substantially "C" shaped having a first end 140 extending axially away from the base plate 116, a second end 144 opposite the first end 140 also extending axially away from the base plate 116, and an intermediate portion 148 extending therebetween and spaced a distance from the base plate 116 (see FIG. 5). In the illustrated embodiment, each rib 128 is substantially parallel to both adjacent ribs 128 to form a plurality of gaps 152 therebetween. As shown in FIG. 8, each rib 128 is oriented parallel to the longitudinal axis 126 of the blade guard 84. When installed, each rib 128 is also parallel to the longitudinal axis 50 of the body 18 and is parallel to both the forward F1 and rearward F2 directions of travel.

Together, the ribs 128 and the base plate 116 encompass the cutting blade 80 both radially and axially. More specifically, the blade guard 84 is positioned so that a datum axis oriented perpendicular to the guard axis 76 will have the guard 84 positioned immediately outside both sides of the blade 80 (e.g., radially encompassed; rib, blade, rib). Furthermore, a datum axis oriented parallel to the guard axis 76 will have the guard 84 positioned immediately above and below the blade 80 (e.g., axially encompassed; plate, blade, rib). Stated differently, the blade guard 84 is shaped so that at least a portion of the blade guard 84 axially overlaps the cutting blade 80. Furthermore, the blade guard 84 is shaped so that at least a portion of the blade guard 84 is positioned below the cutting blade 80 (e.g., positioned between the cutting blade 80 and the support surface 60).

Figure 6:
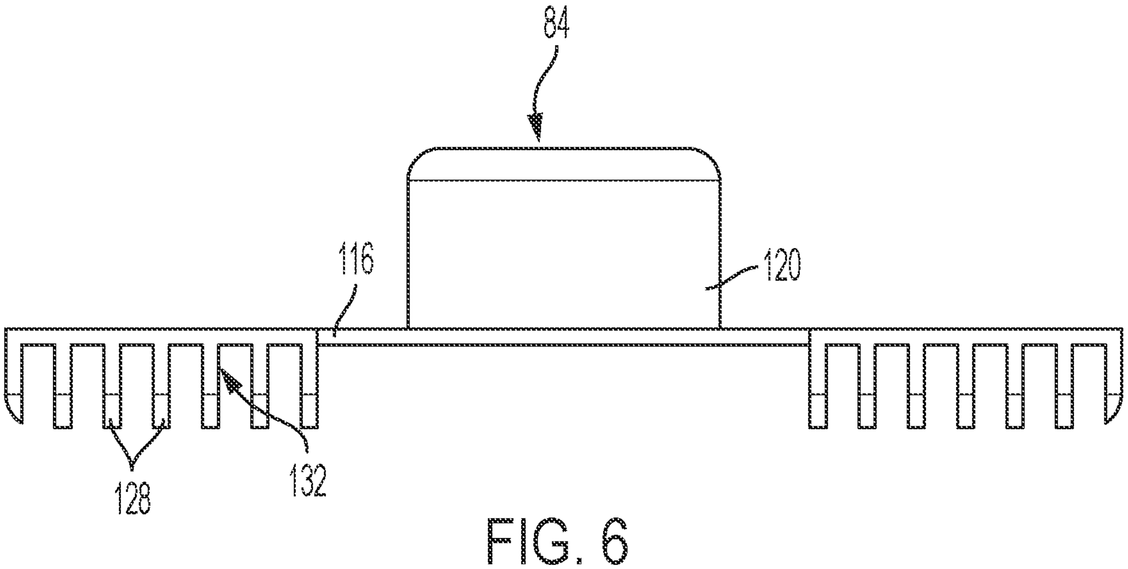
FIG. 6 is a front view of the blade guard of FIG. 4.
Figure 7:
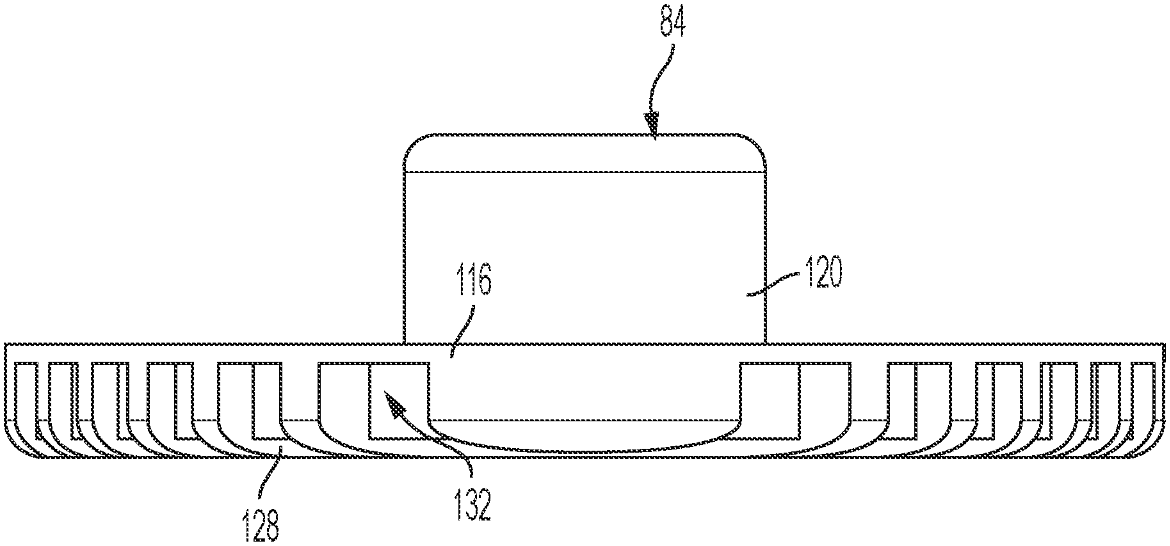
FIG. 7 is a side view of the blade guard of FIG. 4.

As shown in FIGS. 6 and 8, each gap 152 of the blade guard 84 is oriented parallel to the longitudinal axis 126 of the blade guard 84 and extends the entire longitudinal length of the blade guard 84, being open on both ends. When the guard 84 is installed on the body 18, each gap 152 is parallel to the longitudinal axis 50 of the body 18 and is parallel to both the forward F1 and rearward F2 directions of travel. By doing so, the gaps 152 allow vegetation or grass to enter each gap 152, travel along the longitudinal length of each gap 152, and exit each gap 152 with the tops of the vegetation passing through the gaps 152 and extending into the blade volume 132 regardless of whether the tool 10 is traveling in the forward F1 or rearward F2 direction. As the gaps 152 are unimpeded along their entire longitudinal length, the vegetation remains upright as it is engaged and cut by the blade 80 making for a more even cut.

In the illustrated embodiment, the ribs 128 are formed into two groups, each positioned proximate the sides of the blade guard 84 with a large open region 156 therebetween. More specifically, the open region 156 generally corresponds laterally to the width of the flat portions of the base plate 116 while the ribs 128 are positioned in the regions laterally outside the flats. Together, the ribs 128 are positioned so that the guard 84 forms a central "open" portion (e.g., where no ribs 128 are positioned below the blade 80), and two "enclosed" portions on either side perpendicular to the direction of travel F1, F2 (e.g., where the ribs 128 are positioned below the blade 80). As shown in FIG. 8, the blade guard 84 is symmetric about the lateral axis 130.

As shown in FIG. 3, the blade guard 84 is laterally centered with respect to the body 18 of the tool 10 (e.g., the guard axis 76 is lies on the longitudinal axis 50). However, in alternative embodiments the blade guard 84 may be offset to one side or the other. Furthermore, in the illustrated embodiment, the guard width 200 (e.g., the greatest width of the blade guard 84 measured parallel to the lateral axis 54, see FIG. 8) is equal to the body width 204 at the same location. However, in alternative embodiments, the guard width 200 may be greater than or equal to 95%, be greater than or equal to 90%, be greater than or equal to 85%, be greater than or equal to 80%, or be greater than or equal to 75% of the body width 204.

Figure 11:
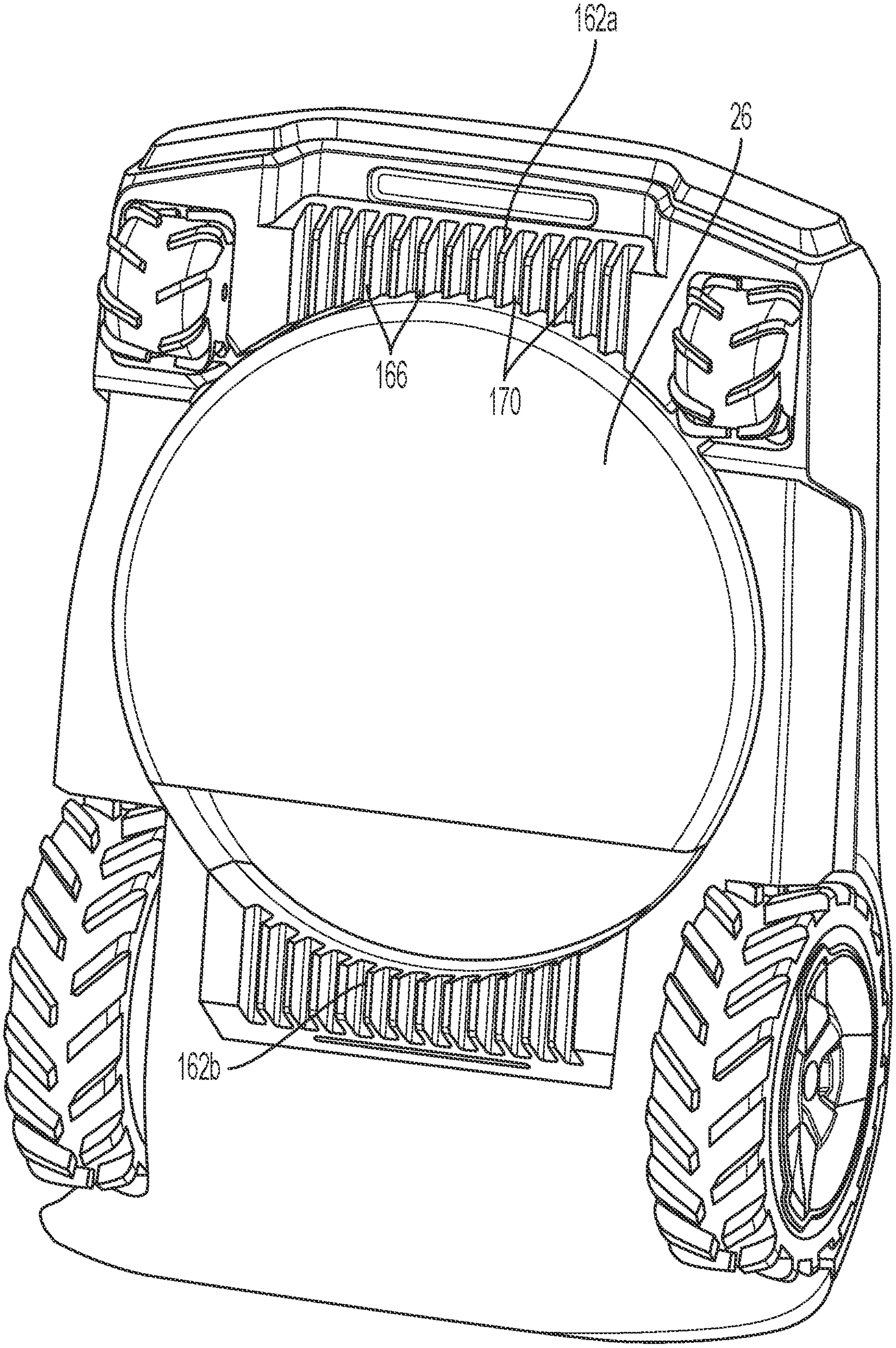
FIG. 11 is a bottom view of the garden tool of FIG. 1.

As shown in FIG. 11, the body 18 of the tool 10 also includes a forward body grass comb 162*a* and rearward body grass comb 162*b*. The forward grass comb 162*a* is positioned between the cutting blade 80 and the first end 34 while the rearward grass comb 162*b* is positioned between the cutting blade 80 and the second end 38. As such, the two grass combs 162*a*, 162*b* are positioned on opposite sides of the cutting blade 80. More specifically, the two grass combs 162*a*, 162*b* are positioned so that a grass comb will be positioned upstream of the cutting blade 80 regardless of whether the tool 10 is traveling in the first direction F1 (e.g., when the forward grass comb 162*a* is positioned upstream of the cutting blade 80 during operation) or the second direction F2 (e.g., when the rearward grass comb 162*b* is positioned upstream of the cutting blade 80 during operation). While the illustrated embodiment includes two combs 162*a*, 162*b*, positioned proximate the first and second ends 34, 38; it is understood that in alternative embodiments more or fewer combs may be implemented to position a comb upstream of the cutting blade 80 in additional directions of travel.

Both grass combs 162*a*, 162*b* include a plurality of teeth 166 extending downwardly from the underside of the tool body 18 to form a plurality of gaps 170 therebetween. Each tooth 166, in turn, is oriented so that the resulting gaps 170 extend parallel with the longitudinal axis 50 of the body 18. Stated differently, the gaps 170 are oriented so that they extend parallel to the direction of travel F1, F2 when the comb 162*a*, 162*b* is positioned upstream of the cutting blade 80 (e.g., parallel to the forward direction F1 for the forward grass comb 162*a* and parallel to the rearward direction F2 for the rearward grass comb 162*b*).

Figure 12:
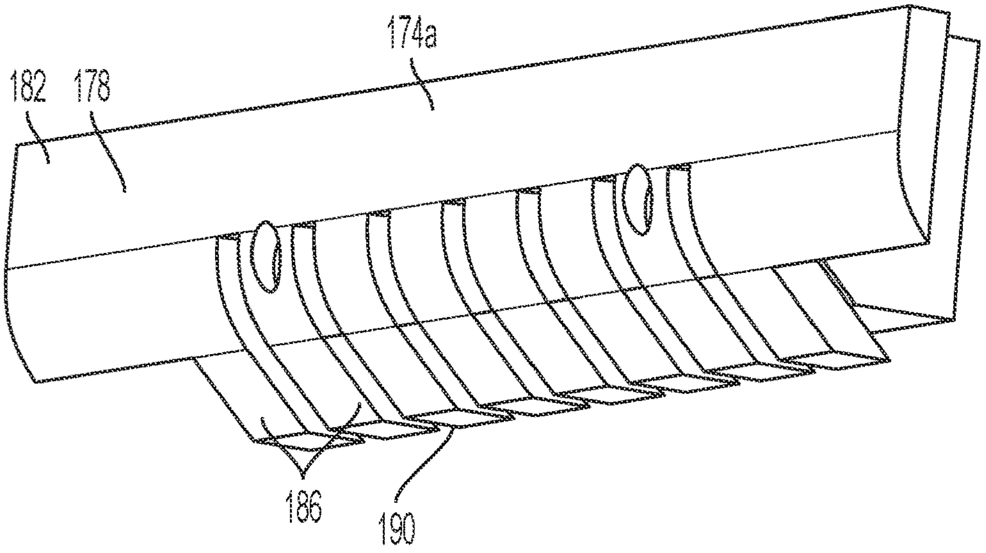
FIG. 12 is a perspective view of the forward bumper of the garden tool of FIG. 1.
Figure 13:
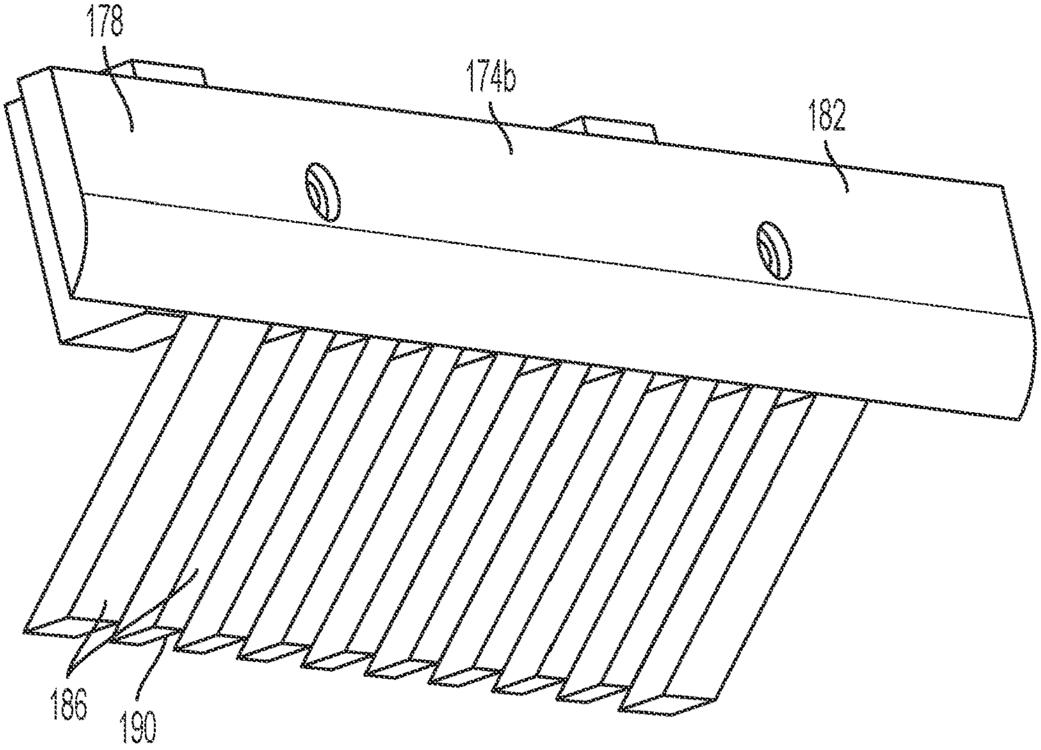
FIG. 13 is a perspective view of the rearward bumper of the garden tool of FIG. 1.

FIGS. 12 and 13 illustrate a pair of bumpers 174*a*, 174*b* movably coupled to the body 18 and configured to output a signal to the controller 30 upon interacting with an external feature (e.g., a user's hand, a user's foot, a rock, a wall, and the like). More specifically, the bumpers 174*a*, 174*b* are mounted to the body 18 such that when a corresponding bumper 174*a* 174*b* comes into contact with an external feature, the bumper 174*a*, 174*b* is displaced relative to the body 18 and subsequently outputs a signal to the controller 30 indicating the same. In the illustrated embodiment, the tool 10 includes a forward bumper 174*a* positioned just forward of the first end 34 of the body 18, and a rearward bumper 174*b* positioned just rearward of the second end 38 of the body 18. Although not shown, additional bumpers may also be present.

Each bumper 174*a*, 174*b* includes an elongated body having an outer surface 178 facing away from the body 18. More specifically, each bumper 174*a*, 174*b* also includes a substantially planar portion 182 and a plurality of teeth 186 extending downwardly from the planar portion 182 toward the support surface 60 to produce a plurality of gaps 190 therebetween. Together, the teeth 186 and gaps 190 form a bumper comb. During use, the teeth 186 are sized to permit the grass or other vegetation to pass therethrough with minimal resistance while still remaining small enough to restrict access of a user's feet or fingers from gaining access to the cutting blade 80.

As shown in FIGS. 12 and 13, each tooth 186 of the forward bumper 174*a* and the rearward bumper 174*b* generally curves toward the body 18 as it extends toward the support surface 60 to generate a tapered shape. This shape helps facilitate slope climbing without undesired contact between the support surface 60 and the bottom end of the bumper 174*a*.

In the illustrated embodiment, the tool 10 includes forward and rearward bumper combs 174*a*, 174*b*, and forward and rearward body grass combs 162*a*, 162*b* so that one of each (e.g., one bumper comb and one body comb) is positioned upstream of the cutting blade 80 whether the tool 10 is traveling in the forward direction F1 or the rearward direction F2. As such, the tool 10 is able to operate at maximum efficiency in both directions.

While not shown, it is understood that in alternative embodiments the tool 10 may only include the bumper combs 174*a*, 174*b*, and/or the body combs 162*a*, 162*b* in a particular embodiment. In such embodiments, the bumper combs 174*a*, 174*b* or body combs 162*a*, 162*b* are typically included in pairs (e.g., one ahead of the cutting blade 80 and one behind the cutting blade 80) to allow for operation in both the first and second direction F1, F2.

While not shown, various aspects or subcomponents of the tool 10 may support one or more axes of symmetry to better accommodate vegetation cutting while traveling in both the first and second directions F1, F2. For example, the wheels 22 may be oriented on the tool 10 so that they have at least longitudinal symmetry (e.g., the axis of symmetry is parallel to the lateral axis 54 or front to back symmetry). Furthermore, any sensors mounted to the body 18 to produce at least longitudinal symmetry. In still other embodiments, the bumpers 174, the grass combs 162, the cutting assembly 26, and the like may also include at least longitudinal symmetry to better accommodate vegetation cutting while traveling in both the first and second directions F1, F2. In still other embodiments, additional axes of symmetry may be present in the above described sub-components to allow vegetation cutting in still more directions of travel (e.g., side-to-side travel, pivoting about a given axis of rotation, and the like).

Figure 14:
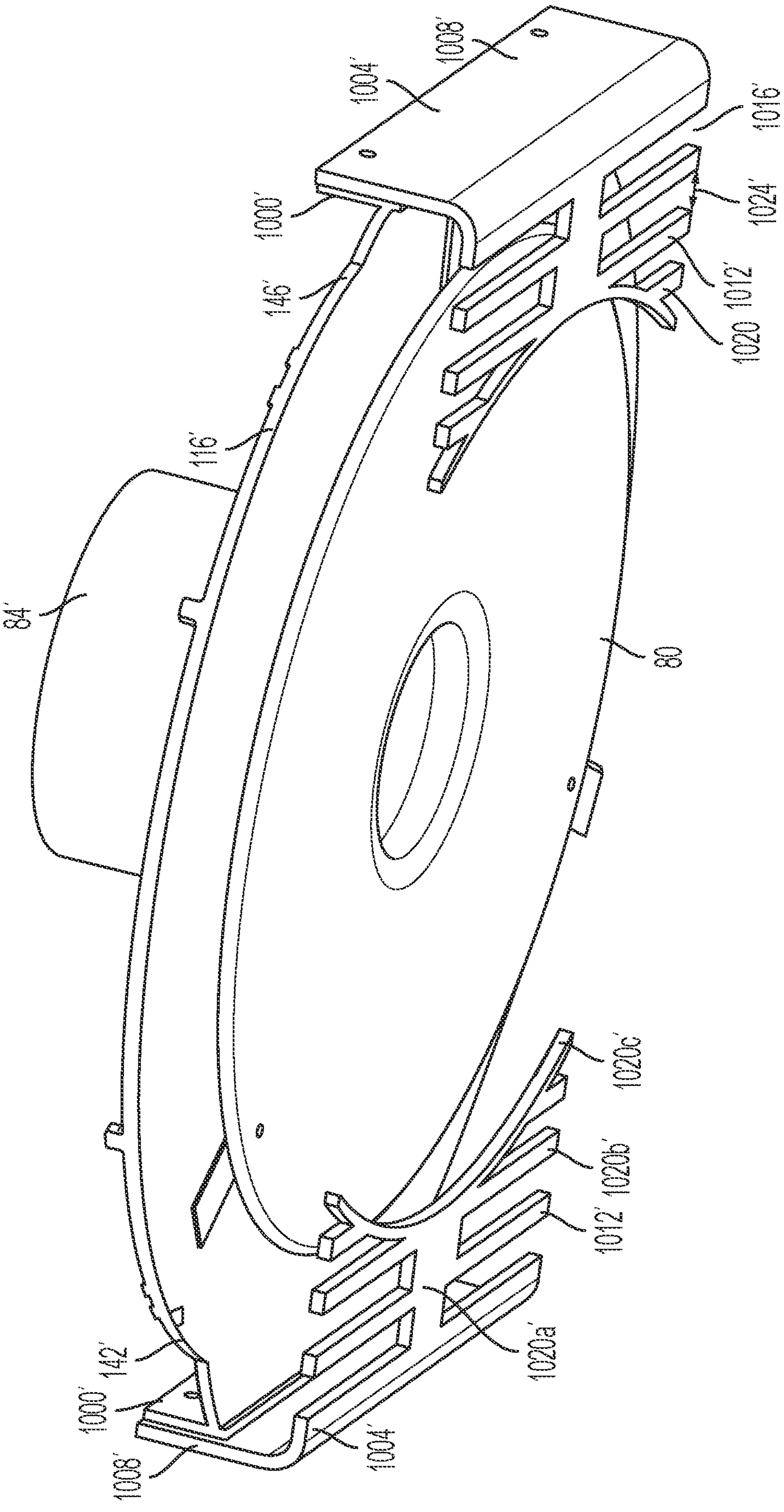
FIG. 14 is a bottom perspective view of another embodiment of a blade guard with a blade mounted thereto.

FIG. 14 illustrates another embodiment of the blade guard 84'. The blade guard 84' is substantially similar to the blade guard 84 described above so only the differences will be described in detail herein. The base plate 116' of the blade guard 84' is substantially disk shaped having an outer periphery that is similar to but slightly greater than the blade diameter 208 of the corresponding cutting blade 80. In instances where multiple blades 80 are to be used interchangeably with a single blade guard 84', the periphery of the base plate 116' is similar but slightly greater than the blade diameter 208 of the largest intended blade 80.

The blade plate 116' also includes a pair of mounting points 1000' extending radially outwardly and axially upwardly (e.g., away from the support surface 60) from the first and second sides 142', 146' thereof. Each mounting point 1000', in turn, provides a mounting location to which a corresponding side guard 1004' may be coupled thereto.

Each side guard 1004' is coupled to a corresponding mounting point 1000' of the blade plate 116' and configured to restrict horizontal and underneath access to the cutting blade 80 during use. More specifically, each side guard 1004' is positioned so that it restricts access to the cutting blade 80 at the locations where the blade 80 is positioned closest to the periphery of the tool body 18. In the illustrated embodiment, the blade 80 is closest to the periphery at the two sides 42, 46 so the guards 1004' are positioned accordingly. However, in alternative embodiments more or fewer guards 1004' may be attached to the blade plate 116' as needed to restrict horizontal and underneath access to the cutting blade 80 along any access vectors available to the user's feet, hands, and the like.

Each side guard 1004' includes a first portion 1008' extending axially downwardly from the blade plate 116' relative to the guard axis 76' and a second portion 1012' extending radially inwardly from the first portion 1008' opposite the blade plate 116'. In the illustrated embodiment, the first portion 1008' of each side guard 1004' is solid, having no apertures or access points formed therein while the second portion 1012' forms a grate of alternating slots 1016' and beams 1020'.

As shown in FIG. 14, the slots 1016' and beams 1020' of the second portion 1012' of the side guard 1004' are oriented so that they are parallel to the longitudinal axis 50 when the guard 84' is mounted to the tool body 18. This orientation serves two purposes, the first to not allow any fingers or toes access to the blade 80, and also to assure that grass and other vegetation is able to access the blade 80 when the tool 10 is traveling in both the first F1 and second F2 directions. In the illustrated embodiment, the second portion 1012' includes a central beam 1020*a*' extending radially inwardly from the first portion 1008', and a plurality of lateral beams 1020*b*' extending perpendicular to the central beam 1020*a*' at predetermined intervals to define a corresponding slot 1016' having a slot width 1024' therebetween. As shown in FIG. 14, the lateral beams 1020*b*' extend outwardly from the central beam 1020*a*' in both a forward and rearward direction (e.g., parallel to the longitudinal axis 50) such that the resulting slots 1016' are open toward both the first end 34 and the second end 38 of the tool 10 (e.g., toward both the first F1 and second F2 direction of travel). Each side guard 1004' also includes an arcuate beam 1020*c*' positioned at the radially inward-most position of the central beam 1020*a*' and curved to be such that the resulting curve is co-axial with the guard axis 76'.

In the illustrated embodiment, each slot width 1024' is no greater than 12 mm, 10 mm, 8 mm, 6 mm, and 4 mm. In other embodiments, each slot 1016' is sized so that it will not permit a 12 mm diameter cylinder to pass therethrough.

While the illustrated side guards 1004' are shown being formed separately and fastened to the blade plate 116' using one or more fasteners, it is understood that in alternative embodiments the side guards 1004' may be formed integrally with the blade plate 116'. In still other embodiments, the side guards 1004' may be fastened to the blade plate 116' so that the axial height between the second portion 1012' and the blade plate 116' may be adjustable.

Figure 15:
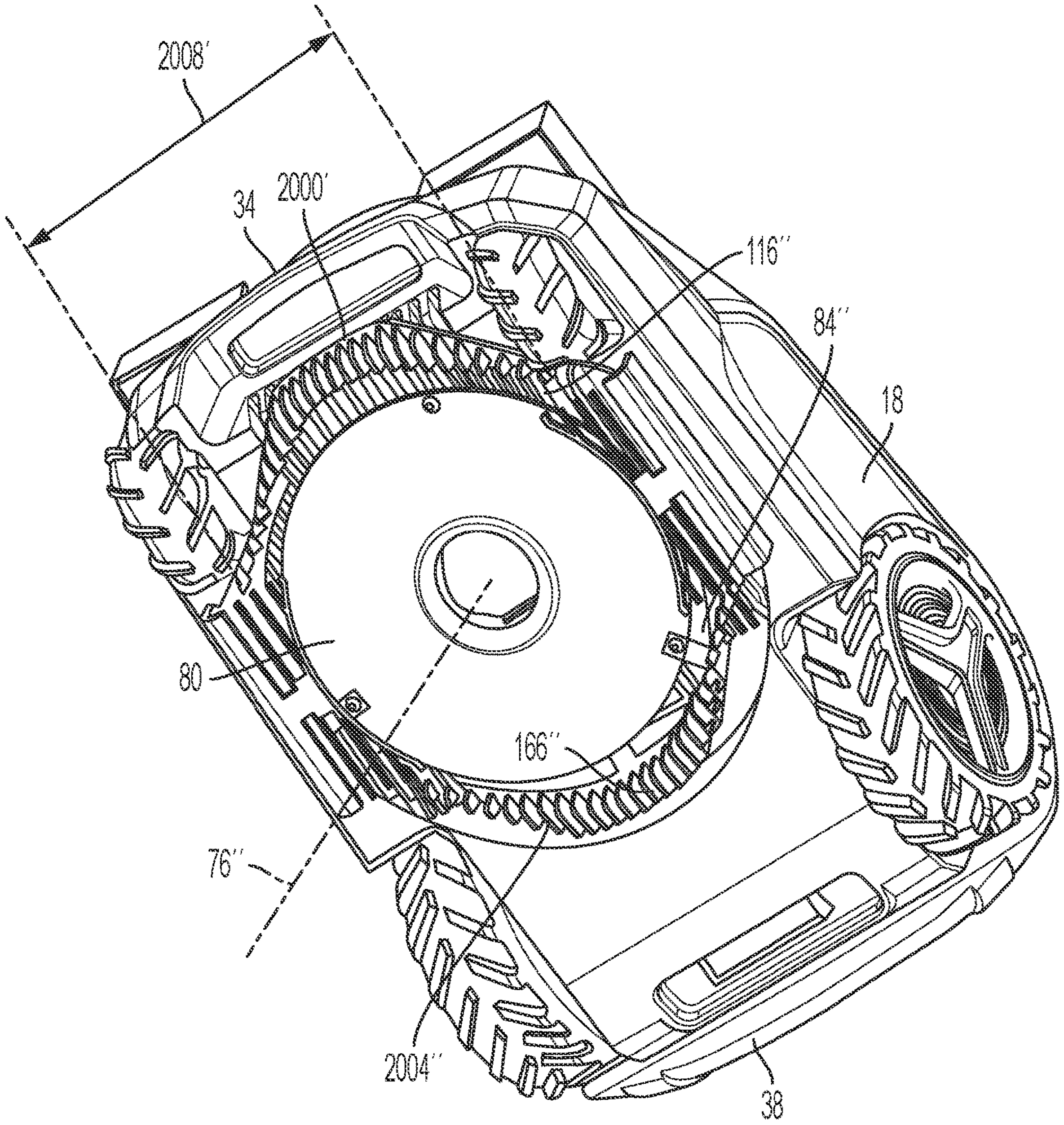
FIG. 15 is a bottom perspective view of another embodiment of a blade guard mounted to a garden tool.

FIG. 15 illustrates another embodiment of blade guard 84". The blade guard 84" is substantially similar to the blade guard 84' described above so only the differences will be discussed in detail here. The blade plate 116" of the blade guard 84" includes a first or grass comb 2000" integrally formed with the blade plate 116" and positioned between the guard axis 76'" and the front end 34 of the tool body 18, and a second or rear grass comb 2004" integrally formed with the blade plate 116" and positioned between the guard axis 76" and the rear end 38 of the tool body 18. By being integrally formed with the blade plate 116", both the first and second grass combs 2000", 2004" float together with the rest of the cutting assembly 26. This allows the grass combs 2000", 2004" are able to travel along and conform to the contour of the support surface 60.

As shown in FIG. 15, both the first and second combs 2000", 2004" define a comb width 2008" measured parallel to the lateral axis 54. In the illustrated embodiment, both combs 2000", 2004" have a comb width 2008" that is greater than the blade diameter 208 of the blade 80. The combs 2000", 2004" are also both shaped so that the depth of the individual teeth 166" within each comb 2000", 2004" decreases the further a corresponding tooth 166" is positioned from the lateral center of the tool 10 (e.g., the further from the longitudinal axis 50). While both combs 2000", 2004" have substantially the same comb width 2008" and comb contour, it is understood that in alternative embodiments each comb 2000", 2004" may have a unique width 2008" and contour.

The blade guard 84" is shaped so that it has at least one axis of symmetry therethrough. More specifically, the illustrated blade guard has two axes of symmetry-a first axis of symmetry in the longitudinal direction (e.g., with the axis of symmetry parallel to the lateral axis 54 or front/back symmetric), and a second axis of symmetry in the lateral direction (e.g., with the axis of symmetry parallel to the longitudinal axis 50 or side to side symmetric). The symmetric nature of the blade guard 84" better facilitates the ability of the tool 10 to operate (e.g., cut vegetation) while traveling in both the first direction F1 and the second direction F2. In instances where more traveling directions are to be accommodated, more axis of symmetry may be present in the blade guard 84".

The invention claimed is:

1. A robotic garden tool comprising:

a body having a first end and a second end opposite the first end;

one or more wheels rotatably coupled to the body;

a cutting assembly coupled to the body;

a first grass comb positioned between the cutting assembly and the first end; and a second grass comb positioned between the cutting assembly and the second end;

a first bumper movably coupled to one of the first end and the second end, and wherein the first bumper includes a first bumper comb.

2. The robotic garden tool of claim 1, further comprising a second bumper movably coupled to the body proximate the other of the first end and the second end, and wherein the second bumper includes a second bumper comb.

3. The robotic garden tool of claim 1, wherein the cutting assembly includes a blade guard defining a guard axis, a motor fixedly coupled to the blade guard, and a cutting blade rotatable with respect to the blade guard about the guard axis.

4. The robotic garden tool of claim 3, wherein the body defines a longitudinal axis passing through the first end and the second end, and wherein the blade guard includes a plurality of ribs, and wherein each rib is oriented parallel to the longitudinal axis.

5. The robotic garden tool of claim 3, wherein the blade guard includes a base plate and one or more ribs, wherein at least a portion of at least one rib is spaced a distance from the base plate to define a volume therebetween, and wherein at least a portion of the cutting blade is positioned within the volume when rotating with respect to the blade guard about the guard axis.

6. The robotic garden tool of claim 3, wherein the body defines a longitudinal axis passing through the first end and the second end, wherein at least one of the first grass comb and the second grass comb define a comb width measured perpendicular to the longitudinal axis, and wherein the comb width is greater than the blade diameter.

7. The robotic garden tool of claim 1, wherein the body defines a longitudinal axis passing through the first end and the second end, wherein at least one of the first grass comb and the second grass comb include a plurality of teeth forming a plurality of gaps therebetween, and where at least a portion of the plurality of gaps extend parallel with the longitudinal axis.

8. The robotic garden tool of claim 1, wherein the body defines a longitudinal axis passing through the first end and the second end, wherein at least one of the first grass comb and the second grass comb include a plurality of teeth forming gaps therebetween, and wherein each gap is parallel to the longitudinal axis.

9. The robotic garden tool of claim 1, wherein at least one of the first grass comb and the second grass comb is movably coupled to the body.

10. The robotic garden tool of claim 1, wherein at least one of the first grass comb and the second grass comb is fixedly coupled to the body.

11. A robotic garden tool comprising:

a body having a first end and a second end opposite the first end, wherein the body defines a longitudinal axis passing through both the first end and the second end; and a cutting assembly coupled to the body, wherein the cutting assembly includes:

a blade guard defining an axis of rotation, the blade guard including a base plate and one or more ribs, wherein at least a portion of at least one rib is spaced axially from the base plate to define a volume therebetween, a cutting blade rotatable with respect to the blade guard about the axis of rotation, and wherein the at least a portion of the cutting blade is positioned within the volume.

12. The robotic garden tool of claim 11, one or more grass combs coupled to the body between the cutting assembly and one of the first end and the second end.

13. The robotic garden tool of claim 11, wherein the cutting assembly further comprises a motor fixedly coupled to the blade guard and configured to rotate the cutting blade with respect to the blade guard about the axis of rotation.

14. The robotic garden tool of claim 11, wherein the blade guard defines a longitudinal blade guard axis, and wherein the one or more ribs are parallel to the blade guard axis.

15. The robotic garden tool of claim 14, wherein the longitudinal blade guard axis is parallel to the longitudinal axis of the body when the blade guard is in a rest position.

16. The robotic garden tool of claim 11, wherein the blade guard includes one or more side guards, and wherein the side guards form the one or more ribs.

17. The robotic garden tool of claim 16, wherein the side guards are removably coupled to the base plate.

18. The robotic garden tool of claim 16, wherein each side guard includes a first portion extending perpendicular to the base plate and a second portion extending perpendicular to the first portion, and wherein the second portion forms the one or more ribs.

19. The robotic garden tool of claim 11, wherein the blade guard includes a lateral axis oriented perpendicular to the longitudinal axis of the body, and wherein the blade guard is symmetric about the lateral axis.

20. The robotic garden tool of claim 11, wherein the base plate and the at least one rib axially overlap the cutting blade.

* * * * *